(12) United States Patent
Li et al.

(10) Patent No.: US 7,742,009 B2
(45) Date of Patent: Jun. 22, 2010

(54) ANTENNA FOR THE PLUG-IN DUAL-INTERFACE SMART CARD

(75) Inventors: Yong Li, Beijing (CN); Xuechao Jiang, Beijing (CN)

(73) Assignee: Beijing Watch Data System Co., Ltd., Beijing (CN)

( * ) Notice: Subject to any disclaimer, the term of this patent is extended or adjusted under 35 U.S.C. 154(b) by 102 days.

(21) Appl. No.: 11/817,234

(22) PCT Filed: Jul. 25, 2006

(86) PCT No.: PCT/CN2006/001840

§ 371 (c)(1),
(2), (4) Date: Oct. 3, 2008

(87) PCT Pub. No.: WO2007/012271

PCT Pub. Date: Feb. 1, 2007

(65) Prior Publication Data

US 2009/0102741 A1    Apr. 23, 2009

(30) Foreign Application Priority Data

Jul. 29, 2005    (CN) .................. 2005 2 0103147 U

(51) Int. Cl.
*H01Q 7/00*    (2006.01)
(52) U.S. Cl. ..................................... 343/866
(58) Field of Classification Search ............... 343/866, 343/742, 842, 702, 787; 340/572.1, 572
See application file for complete search history.

(56) References Cited

U.S. PATENT DOCUMENTS

| | | | | |
|---|---|---|---|---|
| 6,161,761 A | * | 12/2000 | Ghaem et al. ............. | 235/492 |
| 7,280,076 B2 | * | 10/2007 | Ninomiya et al. ......... | 343/702 |
| 7,546,671 B2 | * | 6/2009 | Finn ........................ | 29/592.1 |
| 2001/0002826 A1 | * | 6/2001 | Tuttle et al. ............... | 343/872 |
| 2002/0044096 A1 | * | 4/2002 | Chung ...................... | 343/742 |

FOREIGN PATENT DOCUMENTS

| | | |
|---|---|---|
| CN | 1332588 A | 1/2002 |
| CN | 2696249 Y | 4/2005 |
| JP | 2004171087 | 6/2004 |

* cited by examiner

*Primary Examiner*—Huedung Mancuso
(74) *Attorney, Agent, or Firm*—Gibb I.P. Law Firm, LLC

(57) ABSTRACT

An antenna for the non-contact interface of a plug-in dual-interface smart card, wherein the plug-in smart card includes a card module and chip base, the antenna includes a substrate, antenna loop fixed on the first surface of the substrate, and the first and second pins of the antenna, wherein the substrate comprises a structure to cooperate with the card module, the first and second contact points on the second surface, and the first and second vias. The first and second contact points and structure cooperating with the card module are arranged on the substrate on the position corresponding to the contact points of the plug-in smart card. The first and second antenna pins connect with the first and second contact points via the first and second vias.

11 Claims, 7 Drawing Sheets

ANTENNA FOR THE PLUG-IN DUAL-INTERFACE SMART CARD

TECHNICAL FIELD

The invention relates to an antenna, and more specifically to an antenna for the non-contact part of a plug-in dual-interface smart card.

BACKGROUND OF THE INVENTION

Nowadays, in an IC card with non-contact capability, such as a dual-interface smart card with ID-1 size, the RF antenna loop 111 is always positioned in the chip base 122 of the card, with the two connection points of the antenna loop 111 directly connected with lead wires of the chip 123 of the smart card, as shown in FIG. 1.

As the application of the smart IC card develops, dual-interface smart IC card garners more attention for its double work interfaces and convenient non-contact application mode. Applied in embedded devices such as mobile telephones to realize mobile payment, identity authentication, etc., it will bring much more convenience to our daily lives.

A dual-interface smart card has its unique features in applications of mobile telephones. Take dual-interface SIM card for instance, the contact interfaces get across the SIM neck, and the required working electrical signals such as VCC, CLK and I/O are provided by the mobile telephone. Yet, the non-contact interface of the dual-interface SIM card depends on RF antenna to provide signals such as clock and data for its work. For power signal, the power is provided by VCC when the mobile telephone is on; otherwise, the power is provided by the RF antenna. However, the present scheme that the antenna of ID-1 card is positioned in the chip base cannot meet the application requirement for the embedded devices such as mobile telephones.

Nowadays, the mobile payment scheme based on the mobile phone, which is carried out in countries such as Japan and South Korea, applies the scheme of modifying the mobile phone. The smart IC card with expense payment function is positioned in the mobile phone, and its RF antenna is positioned on the mainboard or backside of the special cell phone battery and connected with the smart IC card via specially designed contact points. This solution has relatively high cost, since it relates to modification of the mobile phone. In the application environment of mobile telecommunications in China, the cost for modification of mobile phones in this method is very evident. The user should purchase a mobile phone with a mobile payment function if he/she wants to use a mobile payment function. Therefore, the utility expense of the user is very high, which would limit the development of mobile payment business.

SUMMARY

In order to avoid the high cost of mobile phone modification, the present invention provides an antenna assembly attached on the surface of the plug-in smart card.

In this antenna for the non-contact interface of the plug-in dual-interface smart card, the plug-in smart card contains a card module and chip base; the antenna contains a substrate, antenna loop fixed on the first surface of the substrate, and the first and second antenna pins. The foregoing substrate includes a structure to cooperate with the card module, the first and second contact points on the second surface, and the first and second vias. The first and second contact points and the structure cooperating with the card module are arranged in the substrate, and in the positions corresponding to the contact points of the plug-in smart card, the first and the second antenna pins connect with the first and second contact points via the first and second vias, respectively.

The foregoing structure cooperating with the card module is formed by two sides connected contact points through the vias in the above-mentioned substrate, in positions corresponding to the contact points of the card module.

When the antenna is attached to the plug-in smart card, contact points in the second surface of the foregoing substrate are connected with the corresponding contact points in the plug-in smart card.

When the plug-in smart card attached with antenna is plugged in the card feeder, each contact point in the feeder is contacted with the corresponding contact point on the first surface of the antenna substrate, the contact connection is the connection between the two sides connected contact points on the substrate and to the corresponding contact points in the plug-in smart card.

The structure cooperating with the card module is a window in the foregoing substrate set aside for parts of the contact points of the smart card in the foregoing substrate, in the positions corresponding to these contact points.

When the antenna is attached to the plug-in smart card, some contact points of the foregoing smart card are exposed through the window.

When the plug-in smart card attached with antenna plugs in the feeder, each contact point in the feeder directly connects with its corresponding contact point in the plug-in smart card.

The foregoing antenna attaches to the plug-in smart card via various connection ways such as gluing, hot-melting, or welding.

The contact points led from the antenna pins of the plug-in smart card chip are positioned in the card module of the plug-in smart card.

The contact points led from the antenna pins of the plug-in smart card chip are positioned on the card edge of the plug-in smart card.

Outstanding advantages of the present invention lie in that an antenna is attached to the plug-in dual-interface smart card, it becomes more convenient to provide a RF antenna to the non-contact interface of the plug-in dual-interface smart card, and the cost of introducing new business based on the non-contact application mode can be reduced.

DETAILED DESCRIPTION OF THE EMBODIMENTS

The technical scheme of the present invention is that, the plug-in dual-interface smart card is externally connected with an antenna on the surface to obtain the power, clock and data signals for its work, wherein the power is provided by the VCC or the antenna depending on whether the mobile telephone is powered on or not. The dual-interface smart IC cards with non-contact capability, such as SIM, UIM and PIM cards, belong to small plug-in cards complying with the standard of ISO7816-1. When these smart cards are used in the mobile telephone, the present technical scheme of attaching an antenna to the smart card is applied to make their non-contact part work properly. When a dual-interface smart card adopting this scheme is used in embedded devices such as mobile telephones, its non-contact interface can perform functions of mobile payment, short-distance communication, etc. via the antenna.

Figure 1:
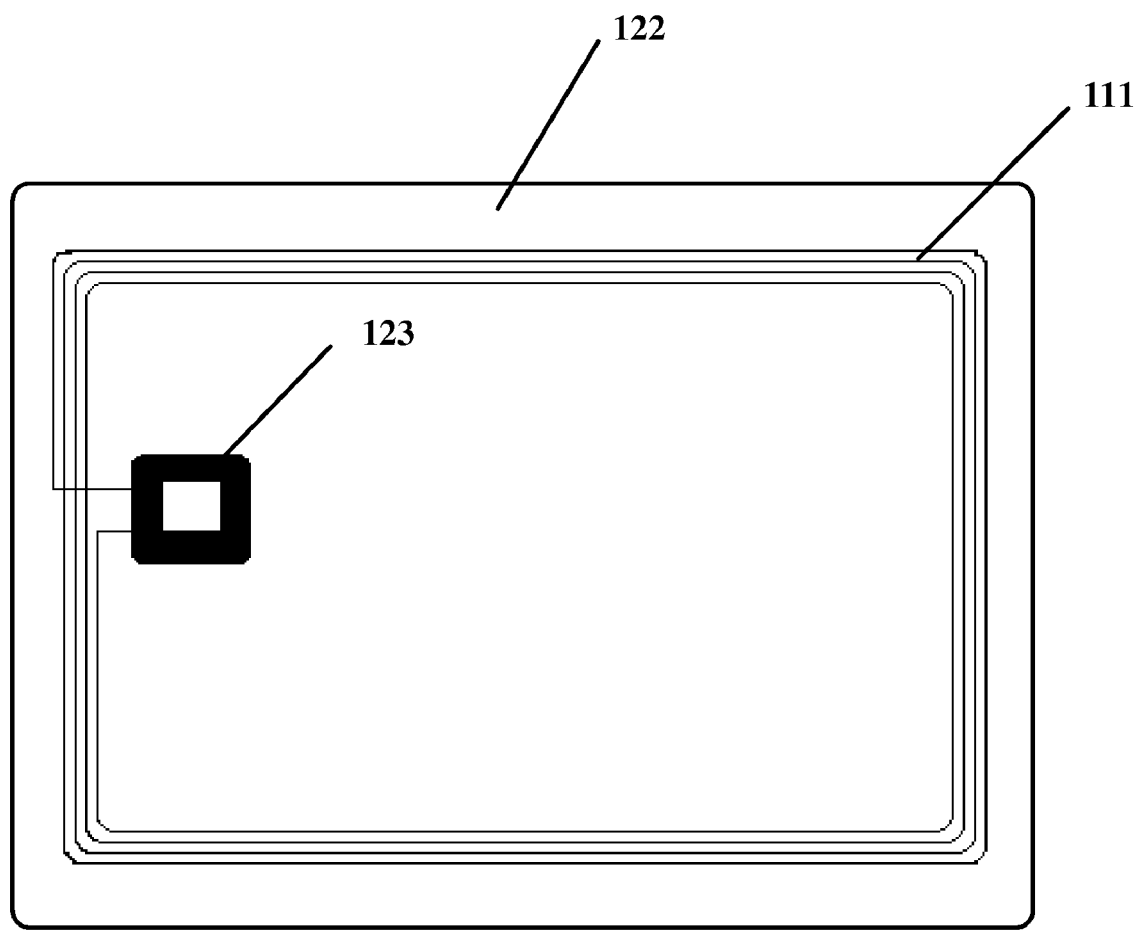
FIG. 1 is the antenna layout method when the dual-interface smart card is an ID-1 card.
Figure 2:
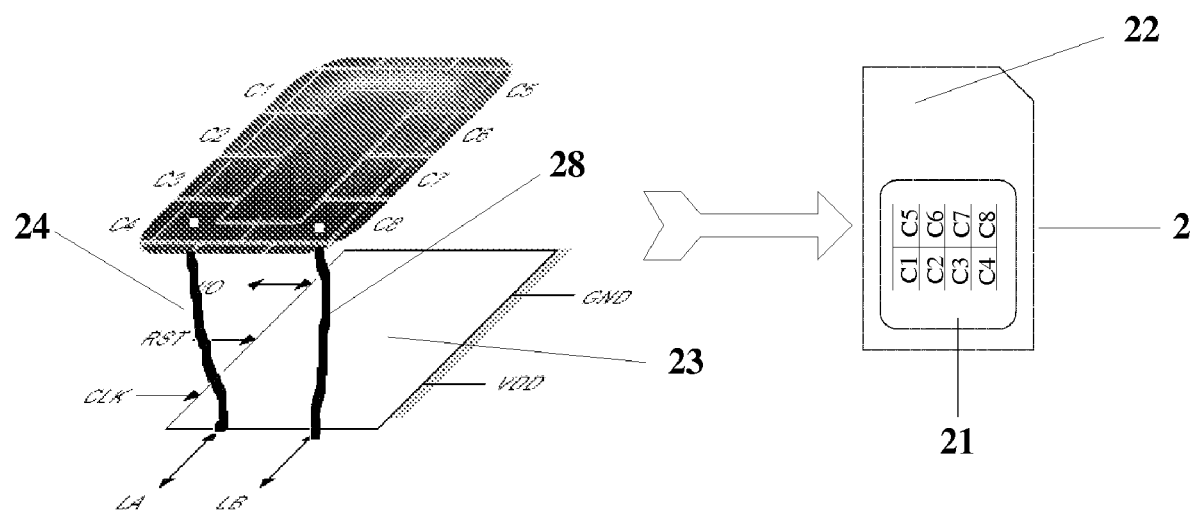
FIG. 2 is an illustration of the connection between the antenna pins in the dual-interface smart card chip and the contact points in the card module.

In the present smart card standards (such as ISO/IEC 7816-3), pins C4 and C8 are reserved, which provides a path for the access of the antenna loop of the plug-in non-contact IC card. Refer to FIG. 2, description of the connection between the antenna pins in the dual-interface smart card chip and the contact points in the card module is given below. When packaging the smart card chip 23 as the module 21 in the smart card 2, the antenna pins LA and LB of the chip 23 are connected with pins C4 and C8 of the module 21 via the lead wires 24 and 28 respectively. The result of packaging is shown as card 2 with plug-in size in FIG. 2. And then, the antenna loop needed by the non-contact part is connected with the contact points C4 and C8 of the module 21 in the way to be described below, to provide RF signal for the non-contact part.

The antenna loop should be attached to the plug-in chip of the dual-interface smart card and combined with the chip base 22 of the smart card by gluing, hot-melting, welding or other methods, which can be considered as attaching the antenna on the plug-in card.

Figure 3:
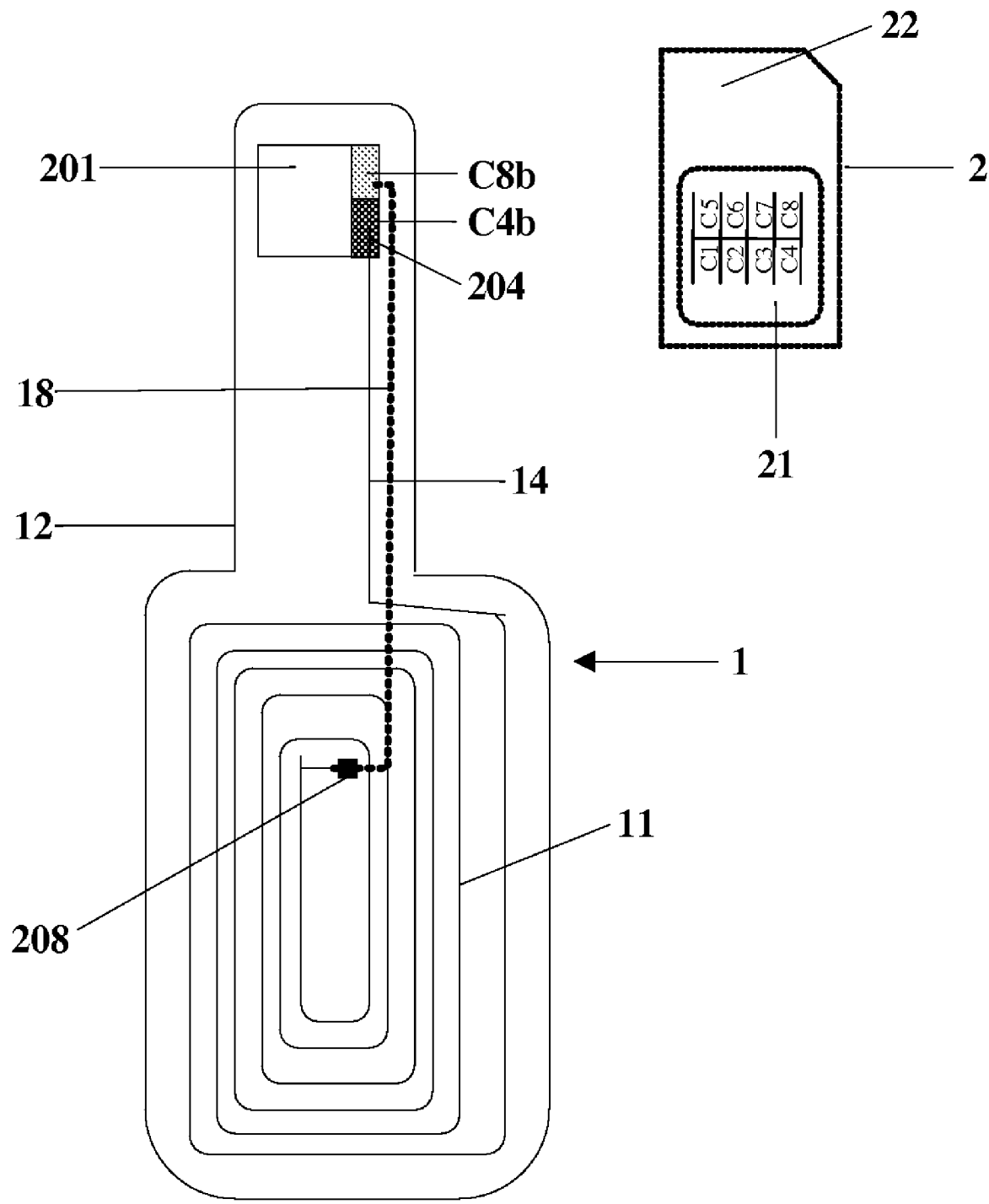
FIG. 3 is a perspective view of the configuration when the antenna assembly and the plug-in card are not combined.

FIG. 3 is a perspective view of the configuration when the antenna assembly and the plug-in card are not combined. As shown in FIG. 3, antenna assembly 1 on the left side includes antenna loop 11, flexible or soft substrate 12, antenna pin 14 connecting with C4, and antenna pin 18 connecting with C8. In more detail, substrate 12 includes structure 201 cooperating with the card module, contact points C4b and C8b on the undersurface, and vias 204 and 208. The plug-in card chip 2 on the right side includes card module 21 and chip base 22. Antenna loop 11 is produced on the surface of the flexible substrate 12 by printing, etching, winding or other processes. Thin film is used as flexible substrate 12 in this embodiment. The design parameters of antenna loop 11, such as Q, L and R, are determined by practical experiments, and these parameters should meet ISO/IEC 14443 and the requirements for an antenna by the smart card chip. Since the thin film is nonconductive, in order to make the antenna pins 14 and 18 connect with the contact points C8 and C4 of the card module 21 respectively, antenna pin 18 passes through via 208 and extends on the undersurface of the antenna substrate to the corresponding position of the contact point C8 where metal contact point C8b is produced. Antenna pin 14 directly extends on the antenna substrate to the corresponding position of the contact point C4, and passes through the via 204, and in which position, the metal contact point C4b is produced.

Figure 4:
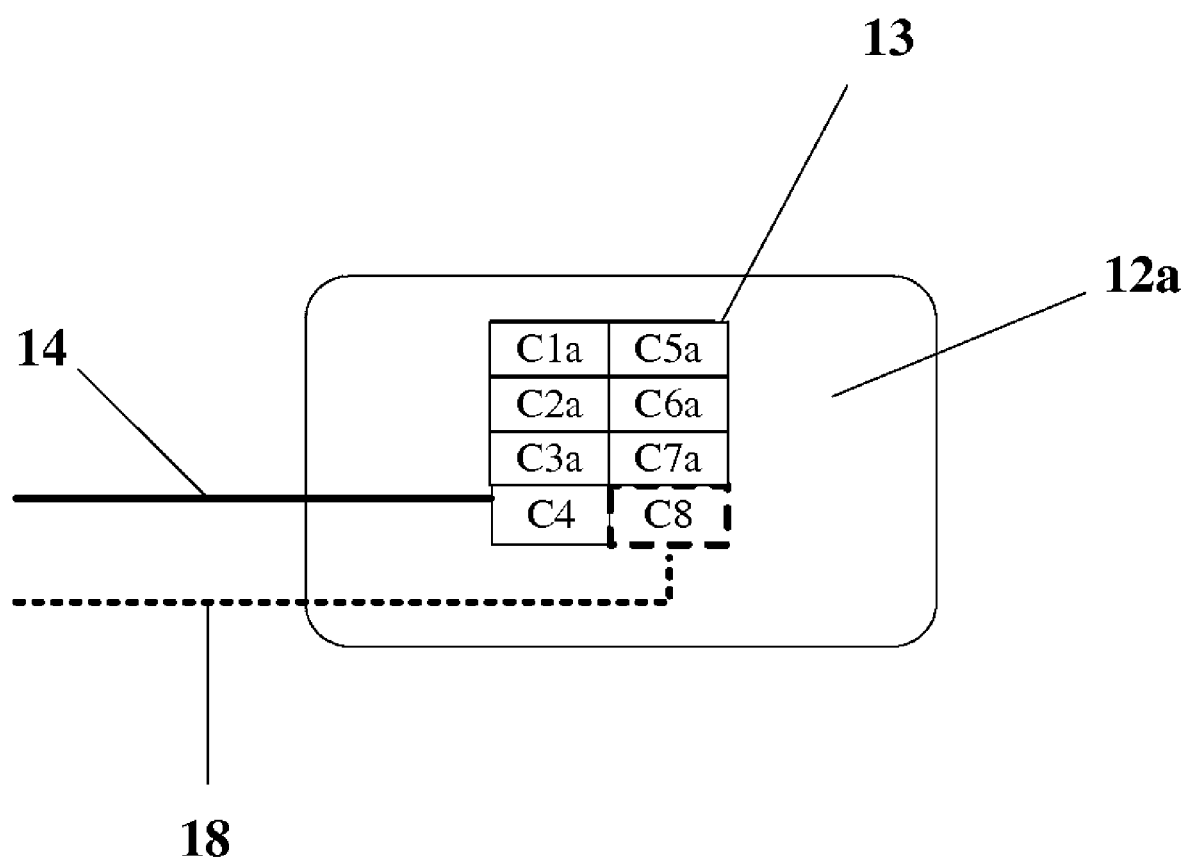
FIG. 4 is a top view of the structure cooperating with the card module in accordance with the first embodiment of the present invention.

FIG. 4 is a top view of the structure cooperating with the card module in accordance with the first embodiment of the present invention. After the antenna assembly shown in FIG. 3 is produced, in order to make the contact points of the IC card feeder (not shown) connect with each contact point of the card module, and, there are two-side-connected contact points meeting the ISO 7816-1 requirement in the antenna substrate on positions corresponding to the contact points C1, C2, C3, C5, C6 and C7 of the card module. As shown in FIG. 4, there are contact points C1a, C2a, C3a, C5a, C6a and C7a on the top surface 12a of the antenna substrate. Contact points corresponding to these contact points are produced on the undersurface of the substrate. Contact points on the top surface and undersurface are connected by vias. Therefore, when each contact point on the undersurface of the antenna substrate respectively contacts with each contact point of the plug-in card module, once each contact point on the top surface of the antenna substrate respectively contacts with each contact point of the IC card feeder, the connection between each contact point on the IC card feeder and its corresponding contact points C1, C2, C3, C5, C6 and C7 in the card module is established. Wherein, contact points C4 and C8 are used to connect with the two contact points of the antenna. It is obvious that the structure 201 cooperating with the card module formed by the two sides connected contact points is the externally connected conductors added between each contact point of the card module and the contact points of the original IC card feeder.

Figure 5:
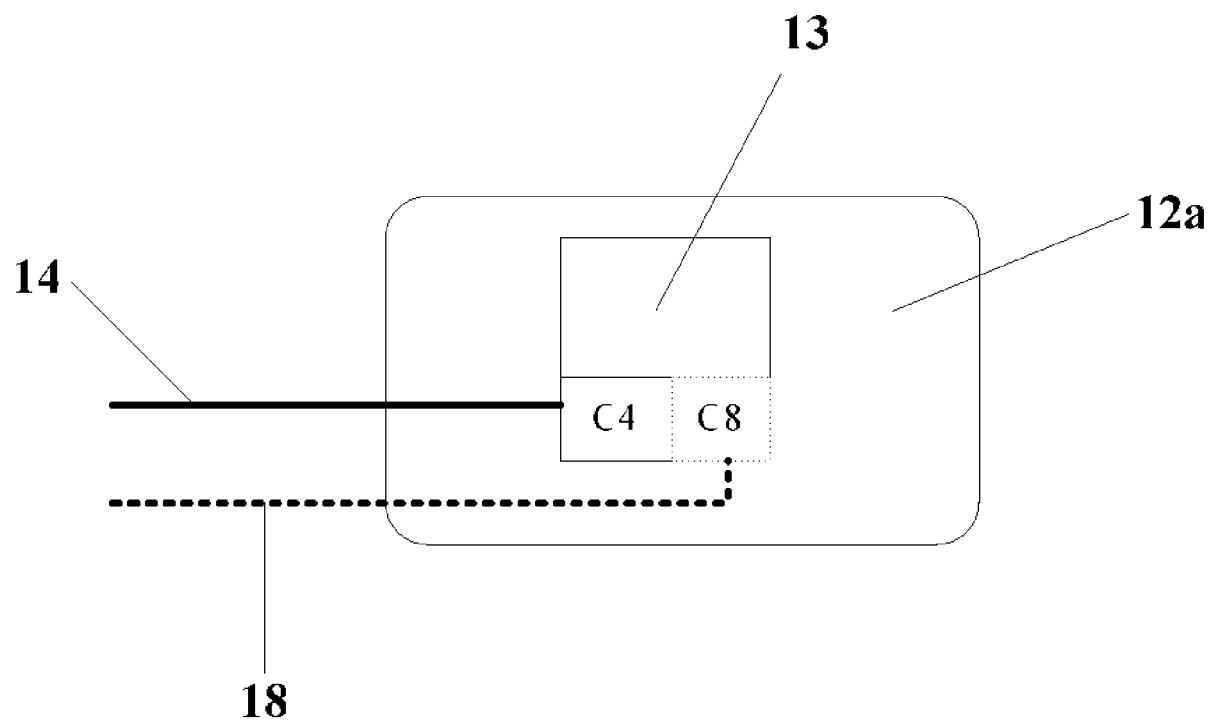
FIG. 5 is a top view of the structure cooperating with the card module in accordance with the second embodiment of the present invention.

FIG. 5 is a top view of the structure cooperating with the card module in accordance with the second embodiment of the present invention. After the antenna assembly shown in FIG. 3 is produced, in order to make the contact points of the IC card feeder (not shown) connect with each contact point of the card module, a window is drilled on the antenna substrate, in the position of structure 201 cooperating with the card module, to reserve space for the contact points C1, C2, C3, C5, C6 and C7 of the card module, as shown in FIG. 5. Therefore, once the antenna substrate attaches on the proper position in the plug-in card, the contact points C1, C2, C3, C5, C6 and C7 of the card module can be exposed.

Figure 6:
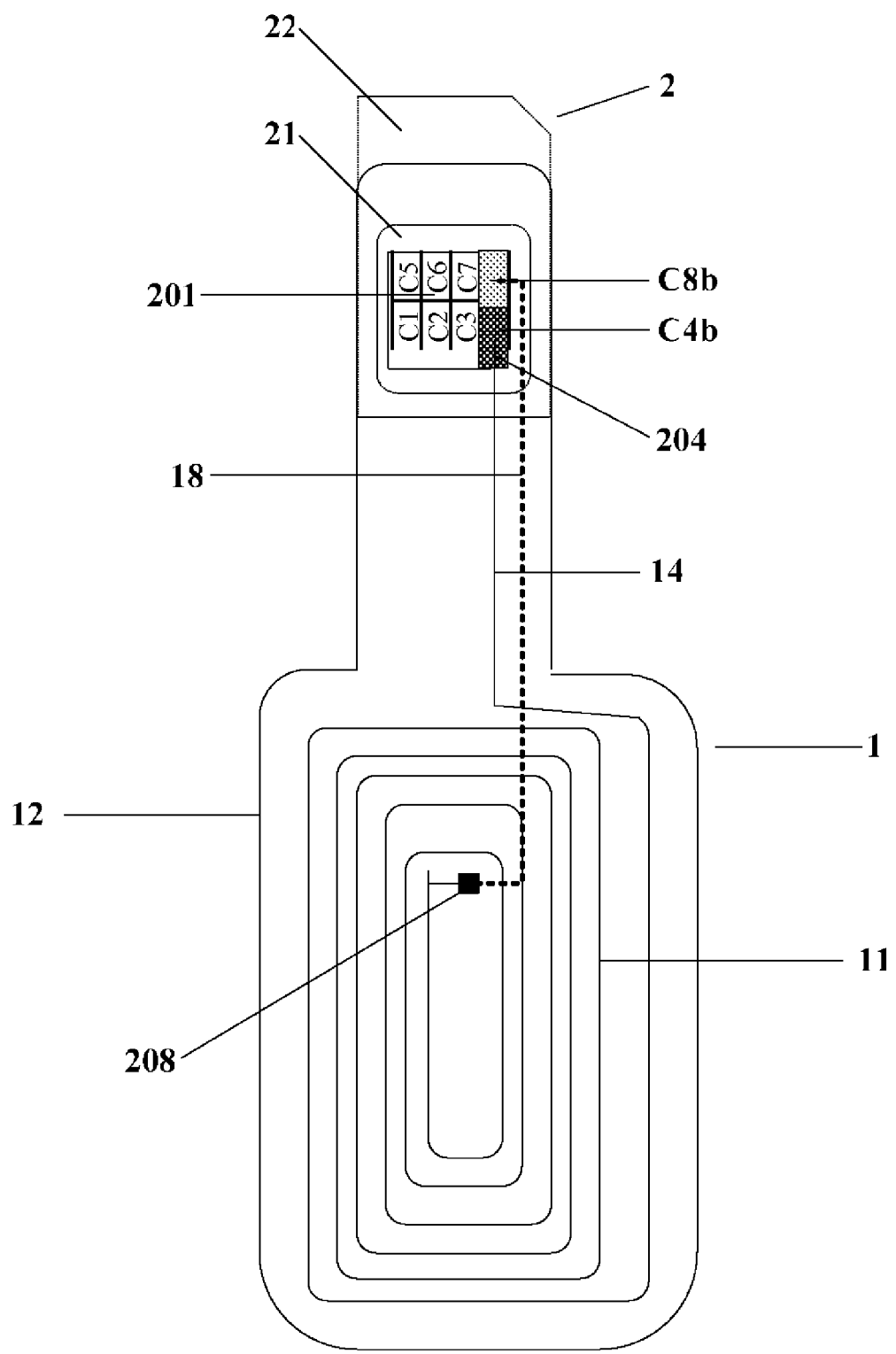
FIG. 6 is a perspective view of configuration for the combined antenna assembly and the plug-in card.

FIG. 6 is a perspective view of configuration for the combined antenna assembly and the plug-in card.

According to the first embodiment, under the condition that the structure 201 cooperating with the card module is formed by the two sides connected contact points, as shown in FIG. 6, when the antenna assembly 1 is attached to the plug-in card chip 2, all contact points on the undersurface of the antenna substrate 12 are aligned with the eight contact points of the card module 21 respectively. Under the condition of guaranteed excellent connection between the corresponding contact points on both sides, the antenna assembly 1 and the plug-in card chip 2 are combined together by gluing, hot-melting or welding. In a way of producing contact points passing through both upper and lower surfaces on the antenna substrate, when the plug-in card is plugged in the IC card feeder, the contact point of the feeder are contacted correspondingly with the contact points C1a, C2a, C3a, C5a, C6a and C7a on the top surface of the antenna substrate which are also connected with their corresponding contact points on the undersurface of the antenna substrate by vias, while contact point on the undersurface of the antenna substrate are closely and correspondingly connected with contact points from C1 to C8 on the card module when the substrate and the card module are combined together. Namely, the connection between contact points on the feeder and those on the card module is implemented by the two side connected contact points on the substrate thin film.

According to the second embodiment, under the condition that the structure 201 cooperating with the card module is open ended, also reference to FIG. 6, the antenna assembly 1 combines with the plug-in card 2 via gluing, hot-melting or welding, alignment between the open top end of antenna substrate 12 and the top end of the card module 21 should be guaranteed to expose the contact points C1, C2, C3, C5, C6 and C7 of the card module, and meanwhile make sure that contact points C4 and C8 of the card module are precisely aligned and reliably connected with the C4b and C8b on the undersurface of the antenna substrate. In the way of opening a window on the antenna substrate, the contact points of the card feeder are directly connected with the contact points C1, C2, C3, C5, C6 and C7 of card module when the plug-in card is plugged in the IC card feeder.

Figure 7:
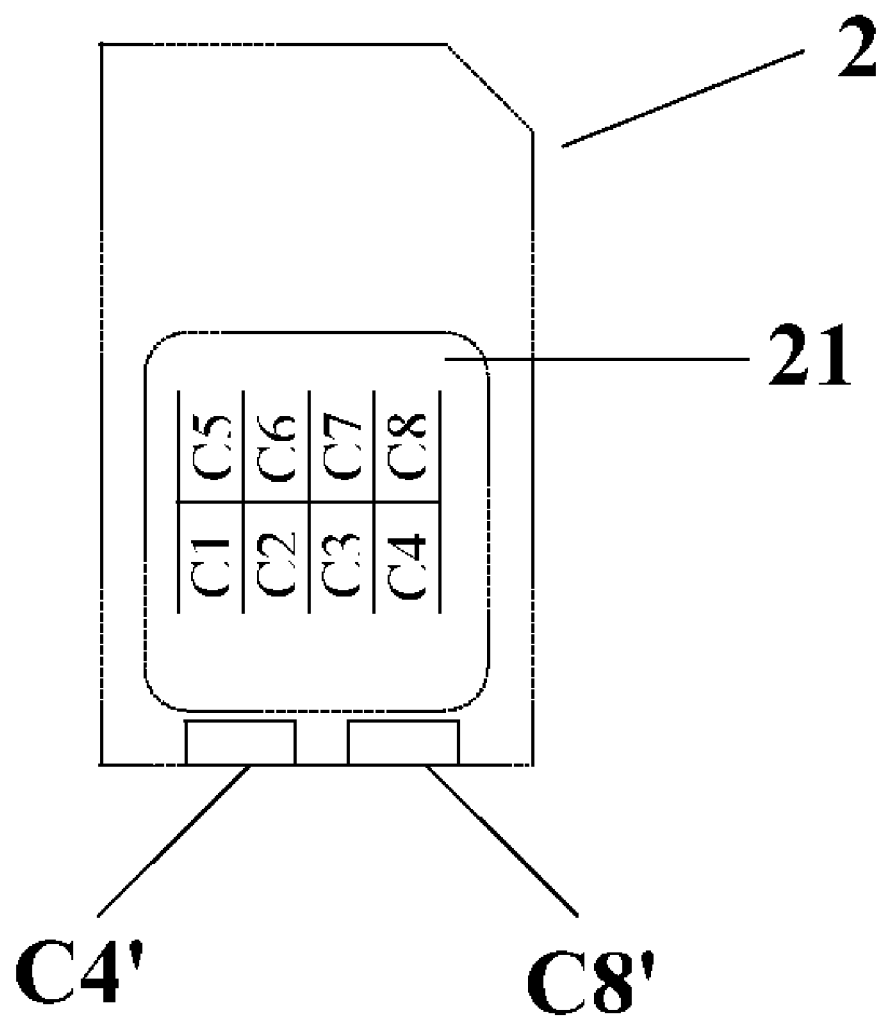
FIG. 7 is a top view of the contact points led from the antenna pins in the smart card chip in accordance with another embodiment.

FIG. 7 is a top view of contact points led from the antenna pins on the smart card chip in accordance with another embodiment. In this embodiment, the antenna pins of the smart card chip are led in a way different from the above-mentioned scheme. The antenna pins LA and LB are led to the card edge of the plug-in smart card 2 to form the contact points C4' and C8' separated from the card module 21. Under this condition, the position of the contact points of the antenna assembly should be correspondingly modified when designing the antenna assembly.

The plug-in smart card is placed in the feeder when working, which requires that the total thickness of the plug-in card and the attached antenna is less than 1 mm.

It will be evident that various modifications and changes may be made thereto without departing from the spirit and scope of the present invention. Thus, the invention described herein is intended to embrace all such modifications and changes as may fall within the appended claims, and their equivalents.

What is claimed is:

1. An antenna for a non-contact interface of a plug-in dual-interface smart card, wherein the plug-in smart card includes a card module and a chip base, said antenna includes a substrate, an antenna loop fixed on a first surface of said substrate, and first and second antenna pins, wherein said substrate comprises a structure cooperating with said card module, first and second contact points, and first and second vias on a second surface of said substrate, wherein said first and second contact points and said structure cooperating with said card module are arranged in said substrate, in positions corresponding to said contact points of the plug-in smart card, and wherein said first and second antenna pins are connected with said first and second contact points respectively via said first and second vias.

2. The antenna as claimed in claim 1, wherein said structure cooperating with said card module is formed by contact points which are two-side connected through the vias and positioned on the substrate corresponding to contact points on said card module.

3. The antenna as claimed in claim 2, wherein each contact point on said second surface of said substrate connects with its corresponding contact point on said plug-in smart card when said antenna is attached to said plug-in smart card.

4. The antenna as claimed in claim 3, further comprising a card feeder, wherein each contact point of said card feeder connects with its corresponding contact point on said first surface of said substrate when said plug-in smart card attached with said antenna is plugged in said card feeder, and said connection is the connection to corresponding contact points of said plug-in smart card by said two sides connected contact points.

5. The antenna as claimed in claim 1, wherein said structure cooperating with said card module is a window set aside for said contact points of said card module on their corresponding positions on said substrate.

6. The antenna as claimed in claim 5, wherein said first and second contact points on said second surface of said substrate connect with their corresponding contact points on said plug-in smart card and said contact points of the smart card are exposed through said window.

7. The antenna as claimed in claim 6, wherein each contact point on said card feeder directly connects with its corresponding contact point on said smart card when said plug-in smart card attached with said antenna is plugged in said card feeder.

8. The antenna as claimed in claim 3, wherein said antenna is attached to said plug-in smart card by gluing, hot-melting, or welding.

9. The antenna as claimed in claim 1, wherein said contact points led by the antenna pins in said plug-in smart card are positioned on said card module of said plug-in smart card.

10. The antenna as claimed in claim 1, wherein said contact points led by said antenna pins in said plug-in smart card are separated from said card module.

11. The antenna as claimed in claim 6, wherein said antenna is attached to said plug-in smart card by gluing, hot-melting, or welding.

* * * * *